United States Patent [19]

Hirose

[11] Patent Number: 5,412,947
[45] Date of Patent: May 9, 1995

[54] CONTINUOUSLY VARIABLE TRANSMISSION

[75] Inventor: Yoshihisa Hirose, Saitama, Japan

[73] Assignee: Honda Giken Kogyo Kabushiki Kaisha, Tokyo, Japan

[21] Appl. No.: 135,144

[22] Filed: Oct. 12, 1993

Related U.S. Application Data

[63] Continuation of Ser. No. 921,700, Jul. 30, 1992, abandoned.

[30] Foreign Application Priority Data

Apr. 2, 1992 [JP] Japan .................................. 4-109242

[51] Int. Cl.6 ............................................. F16D 31/02
[52] U.S. Cl. ........................................ 60/454; 60/485; 60/487
[58] Field of Search ................... 60/454, 485, 487, 489

[56] References Cited

U.S. PATENT DOCUMENTS

| | | |
|---|---|---|
| 4,856,368 | 8/1989 | Fujisaki et al. . |
| 4,870,820 | 10/1989 | Nemoto .................. 60/487 |
| 4,891,943 | 1/1990 | Okada .................... 60/487 |
| 4,893,524 | 1/1990 | Ohashi et al. ........... 60/487 |
| 5,078,659 | 1/1992 | Von Kaler et al. ...... 60/487 |

FOREIGN PATENT DOCUMENTS

2337251A1  1/1975  Germany .
58-32984    7/1983  Japan .

Primary Examiner—F. Daniel Lopez
Attorney, Agent, or Firm—Dickstein, Shapiro & Morin

[57] ABSTRACT

A working machine such as a powered lawn mower has a continuously variable transmission for transmitting the power of an engine to wheels at a variable speed reduction ratio. The continuously variable transmission comprises an axial-plunger-type hydraulic pump disposed in a case for producing a hydraulic pressure, and an axial-plunger-type hydraulic motor disposed in the case for producing a rotary motion in response to the hydraulic pressure supplied from the hydraulic pump. The hydraulic pump has a pump cylinder with a plurality of pump plungers axially movably disposed therein, and the hydraulic motor has a motor cylinder with a plurality of motor plungers axially movably disposed therein. The pump and motor cylinders are disposed closely in juxtaposed relationship in the case and having respective axes that are perpendicular to each other.

16 Claims, 9 Drawing Sheets

CONTINUOUSLY VARIABLE TRANSMISSION

This application is a continuation of application Ser. No. 07/921,700 filed Jul. 30, 1992, now abandoned.

BACKGROUND OF THE INVENTION

1. Field of the Invention

The present invention relates to a continuously variable transmission comprising a hydraulic pump and a hydraulic motor, for use in a small-size working machine such as a powered lawn mower or the like.

2. Description of the Prior Art

Conventional continuously variable transmissions comprising a hydraulic pump and a hydraulic motor for use in agricultural machines are disclosed in Japanese utility model publication No. 58-32984 and Japanese laid-open patent publication No. 64-4512.

In each of the disclosed continuously variable transmissions, the hydraulic pump and motor have their cylinders oriented such that the continuously variable transmission has input and output shafts extending perpendicularly to each other, the input shaft being coupled to the hydraulic pump and the output shaft to the hydraulic motor. The continuously variable transmission has a partition, a bearing, and other parts disposed between the cylinders of the hydraulic pump and motor. The hydraulic pump includes a swash plate for controlling the displacement thereof. The swash plate is movably supported by a support member which is fixed to the case of the continuously variable transmission.

While the input shaft coupled to the hydraulic pump and the output shaft coupled to the hydraulic motor extend perpendicularly to each other, as described above, the cylinders of the hydraulic pump and motor are spaced from each other because of the partition, the bearing, and other parts interposed therebetween. Therefore, the outer profile of the case of the continuously variable transmission is relatively large. Furthermore, the swash plate for controlling the pump displacement is supported by a complex structure including the support member described above.

SUMMARY OF THE INVENTION

In view of the aforesaid drawbacks of the conventional continuously variable transmissions, it is an object of the present invention to provide a continuously variable transmission which has a compact outer profile and a simple structure, and which is made up of a reduced number of parts.

According to the present invention, there is provided a continuously variable transmission for transmitting the power of an engine to wheels at a variable speed reduction ratio, comprising a case, an axial-plunger-type hydraulic pump disposed in the case for producing a hydraulic pressure, the hydraulic pump having a pump cylinder with a plurality of pump plungers axially movably disposed therein, and an axial-plunger-type hydraulic motor disposed in the case for producing a rotary motion in response to the hydraulic pressure supplied from the hydraulic pump, the hydraulic motor having a motor cylinder with a plurality of motor plungers axially movably disposed therein, the pump and motor cylinders being disposed closely in juxtaposed relationship in the case and having respective axes extending perpendicularly to each other.

The hydraulic pump has an input shaft and the hydraulic motor has an output shaft, and the input and output shafts extend coaxially through the pump and motor cylinders, respectively, in spaced perpendicular relationship to each other. The hydraulic pump and the hydraulic motor have respective base plates for distributing a hydraulic pressure to the pump and motor cylinders, the base plates serving as covers mounted on the case. The hydraulic pump has a hydraulic pump chamber defined in the case and a swash plate held in sliding contact with the pump plungers and angularly movably disposed in the hydraulic pump chamber for adjusting the displacement of the hydraulic pump. The swash plate has shafts on respective opposite ends thereof, one of the shafts being angularly movably supported by the case, and the other of the shafts being angularly movably supported by the base plate of the hydraulic motor, whereby the swash plate can be angularly moved about the shafts.

The hydraulic motor has a hydraulic motor chamber defined in the case, and the output shaft extends through the hydraulic motor chamber and has opposite ends projecting from the case and the base plate of the hydraulic motor, whereby the rotary motion produced by the hydraulic motor can be extracted from either one of the opposite ends of the output shaft. The base plate of the hydraulic motor has a pair of symmetrically shaped arcuate grooves defined therein and a pair of oil passages defined therein across the arcuate grooves.

The hydraulic motor has a cylinder plate held against the motor cylinder, and the hydraulic pump has a filter for filtering oil to be supplied to the pump cylinder. The filter is fixed in place by the case, the base plate of the hydraulic pump, and a portion of the cylinder plate.

The hydraulic pump has a pump chamber defined in the case, and the hydraulic motor has a motor chamber defined in the case in communication with the pump chamber. The case has a hole defined therein, and an elastic membrane is disposed in the hole and fixed to the case in covering relationship to the hole, for elastically absorbing expansion of working oil in the pump and motor chambers, the pump and motor chambers being isolated from the exterior of the case by the elastic membrane.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
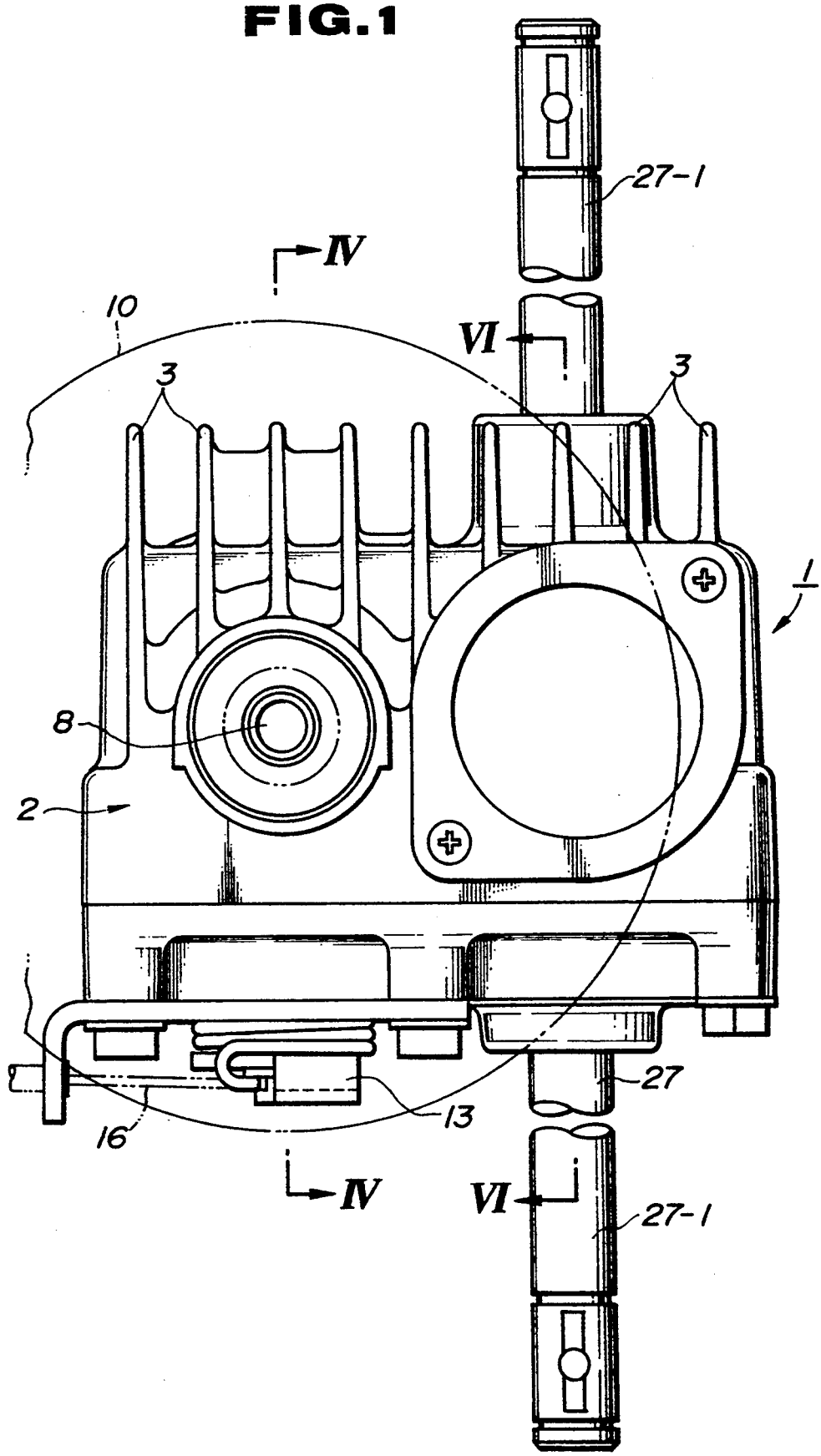
FIG. 1 is a plan view of a continuously variable transmission according to the present invention.
Figure 2:
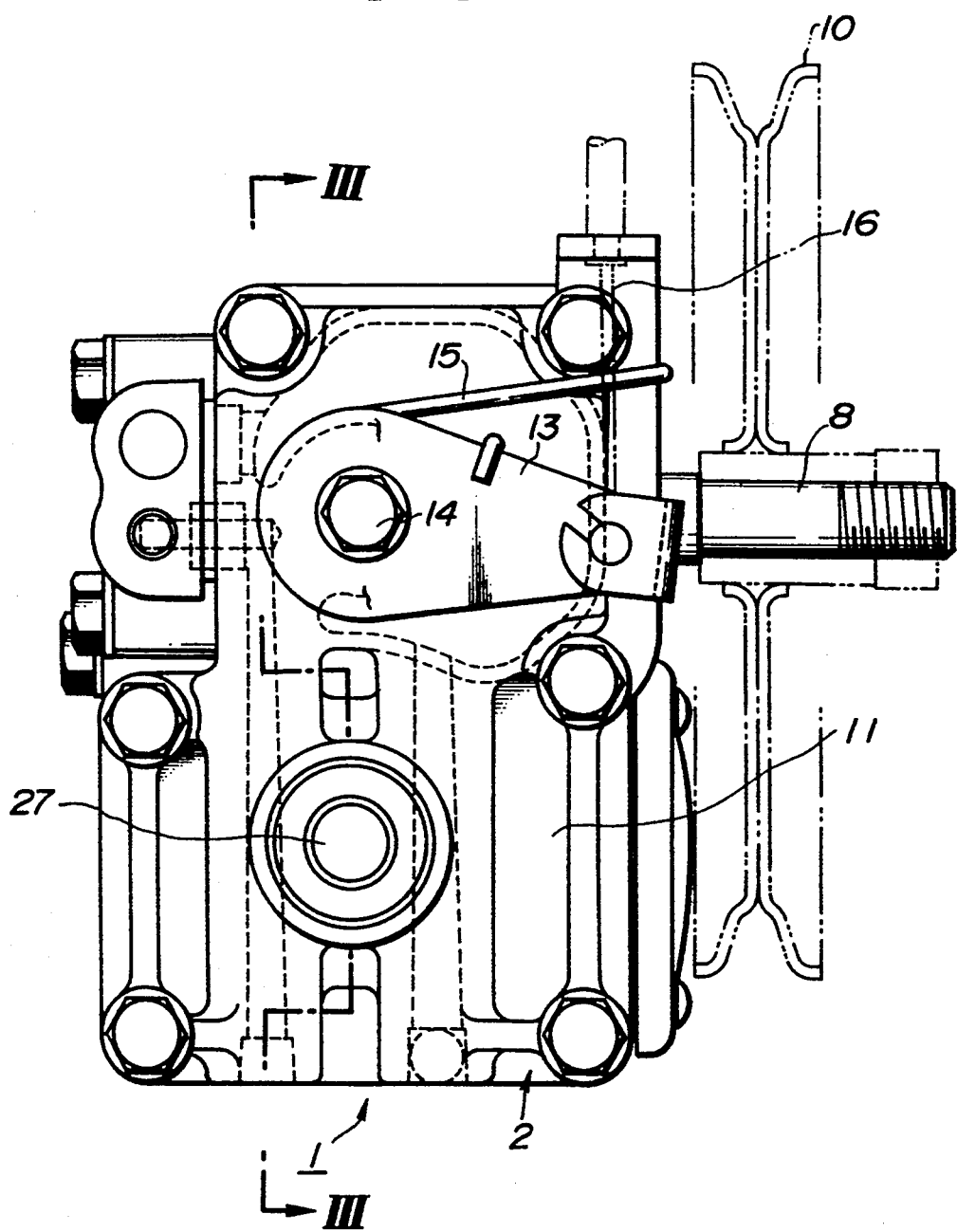
FIG. 2 is a front elevational view of the continuously variable transmission shown in FIG. 1.
Figure 11:
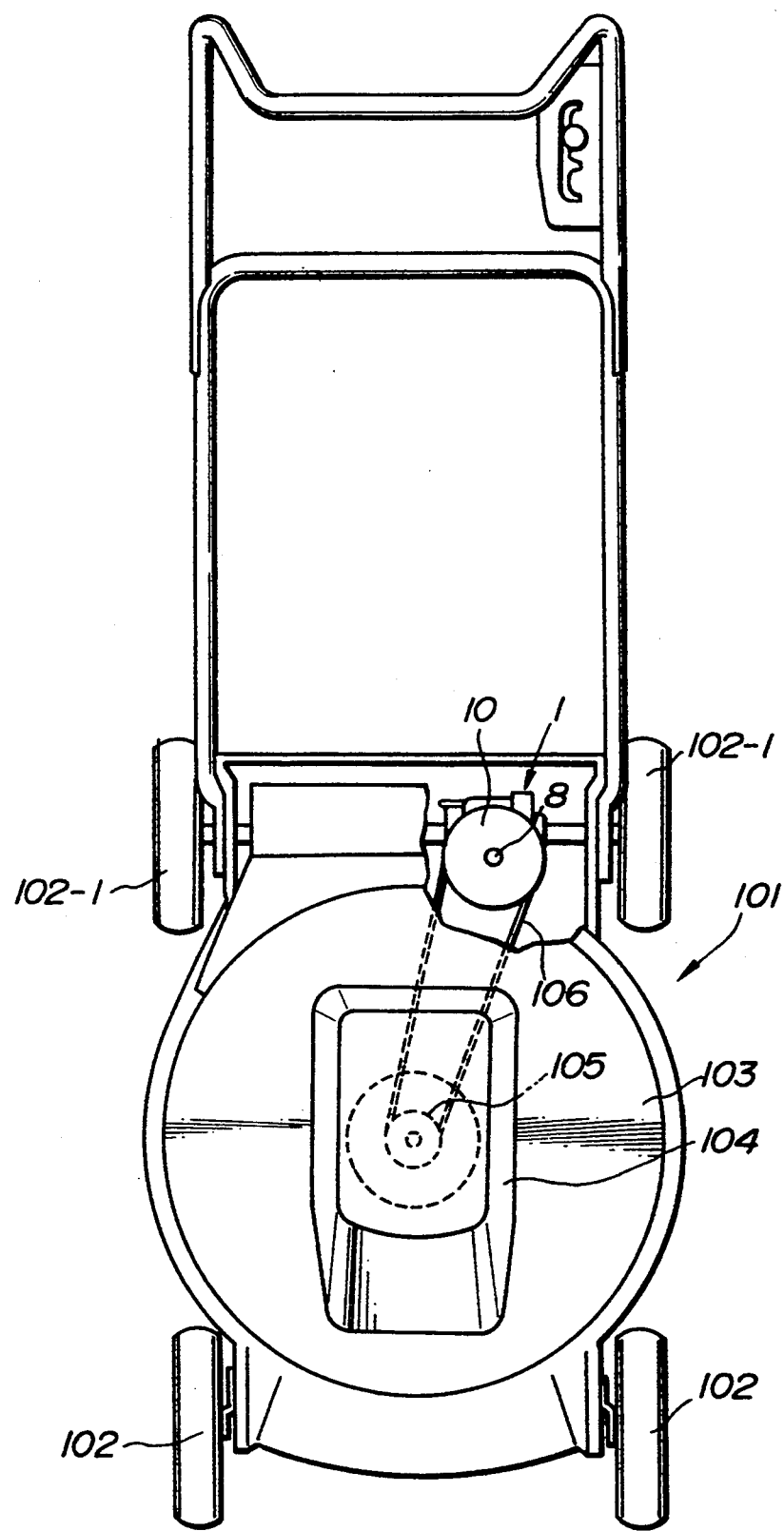
FIG. 11 is a plan view of a powered lawn mower which incorporates the continuously variable transmission according to the present invention.

FIGS. 1 and 2 show a continuously variable transmission, generally designated by the reference numeral 1, according to the present invention. The continuously variable transmission 1 may typically be incorporated in a powered lawn mower 101 as shown in FIG. 11. The powered lawn mower 101 has four wheels 102 including two rear wheels 102-1, a cutter housing 103 disposed between the wheels 102, and an engine 104 mounted on the cutter housing 103. The engine 104 has an output shaft with a pulley 105 fixed thereto. The continuously variable transmission 1 has an input shaft 8 to which a pulley 10 is fixed. An endless belt 106 is trained around the pulleys 105, 10 for transmitting the power from the engine 104 to the input shaft 8 of the continuously variable transmission 1 which rotates the rear wheels 102-1 at a continuously variable speed reduction ratio.

Figure 3:
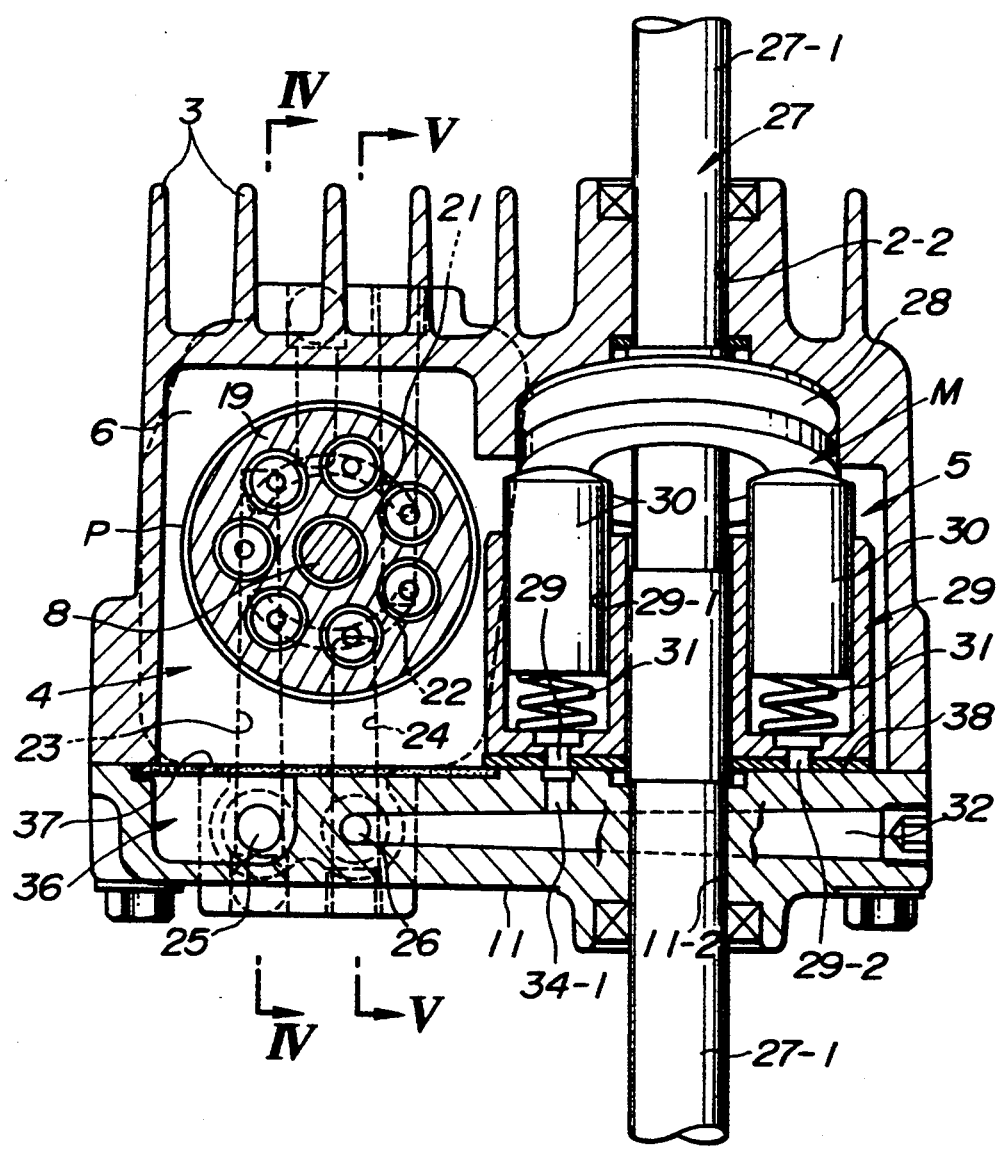
FIG. 3 is a cross-sectional view taken along line 3—3 of FIG. 2.
Figure 10:
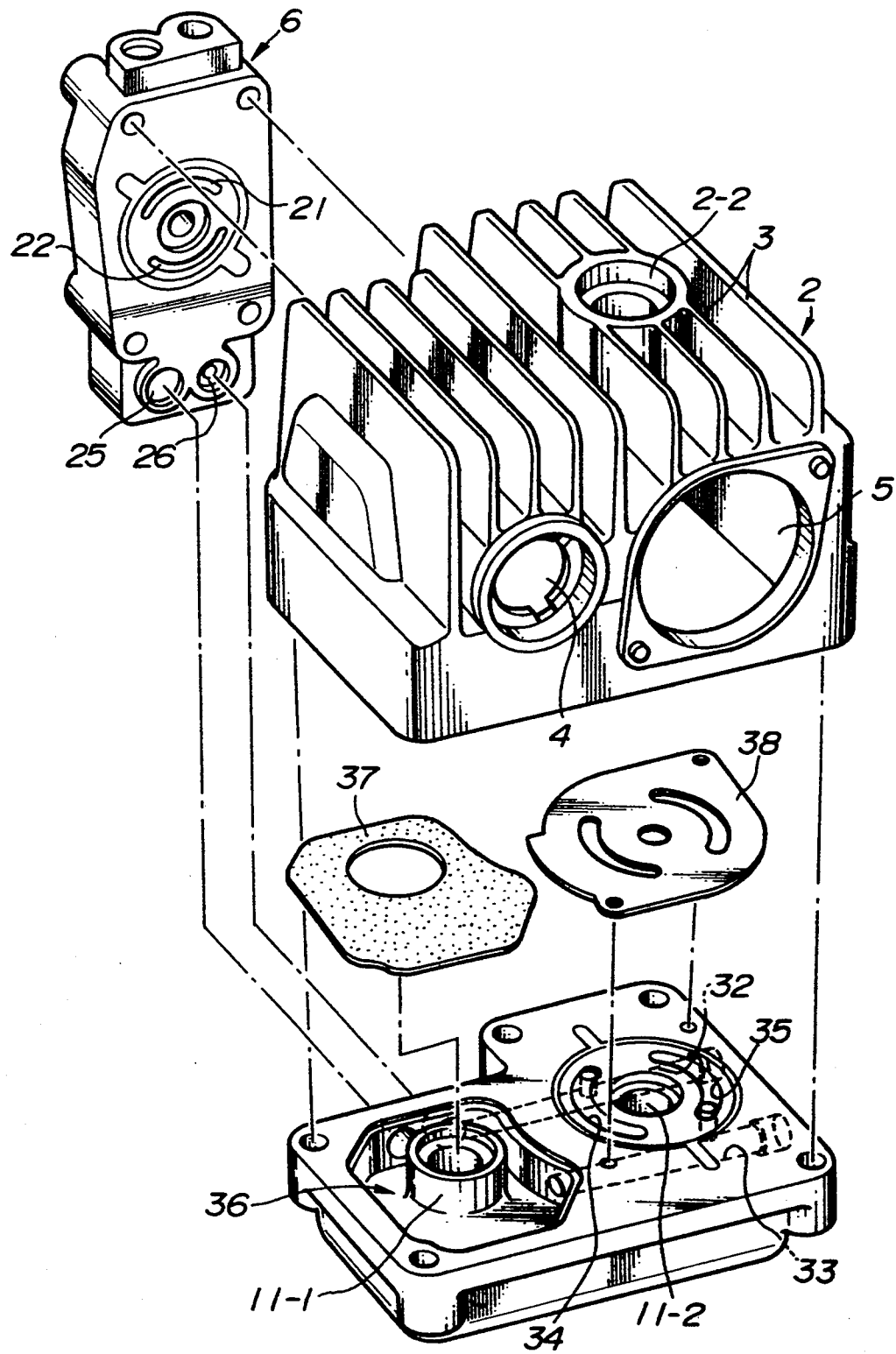
FIG. 10 is an exploded perspective view of a case, a cover, and other parts of the continuously variable transmission.

As shown in FIGS. 1 and 2, the continuously variable transmission 1 includes a unitary case 2 having a plurality of cooling fins 3 projecting on its outer surface. The case 2 accommodates therein an axial-plunger-type hydraulic pump P and an axial-plunger-type hydraulic motor M, as shown in FIG. 3. As shown in FIGS. 3 and 10, the case 2 has a hydraulic pump chamber 4 and a hydraulic motor chamber 5 defined therein adjacent to each other in juxtaposed relationship. The hydraulic pump chamber 4 and the hydraulic motor chamber 5 are in communication with each other, and the axes of the chambers 4 and 5 are perpendicular to each other.

The hydraulic pump chamber 4 is defined by portions of the case 2 as its upper and side panels, a cover 6 as its bottom panel, and a cover 11 as another side panel. Each of the covers 6, 11 serves as a base plate for distributing hydraulic pressure, and the cover 11 extends to cover the hydraulic motor chamber 5.

Figure 4:
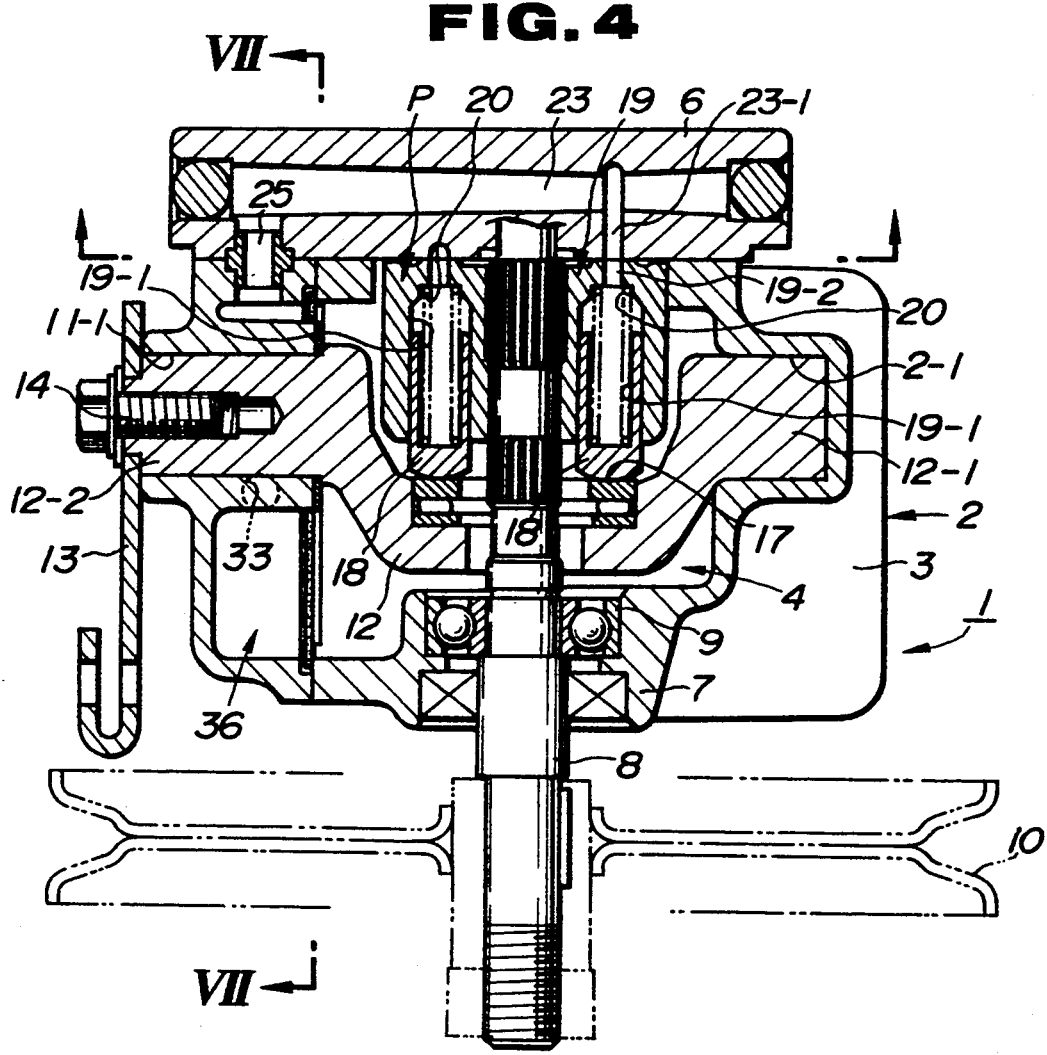
FIG. 4 is a cross-sectional view taken along line 4—4 of FIGS. 1 and 3, showing a hydraulic pump.
Figure 5:
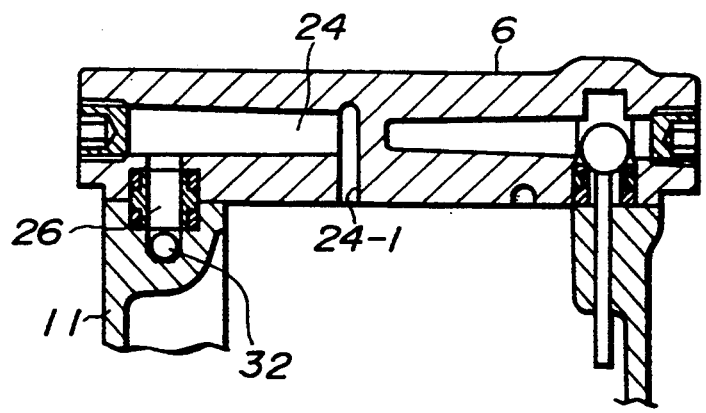
FIG. 5 is a cross-sectional view taken along line 5—5 of FIG. 3.

As shown in FIG. 4, the upper panel of the hydraulic pump chamber 4 has a boss 7 in which an input shaft 8 is rotatably supported by a bearing 9 disposed in the boss 7. The input shaft 8 has an inner end rotatably supported by the center of the cover 6.

The pulley 10 is fixedly mounted on an outer end of the input shaft 8 which projects out of the case 2. As described above, the pulley 10 is operatively coupled to the pulley 105 by the belt 106 in power transmitting relationship thereto.

Figure 9:
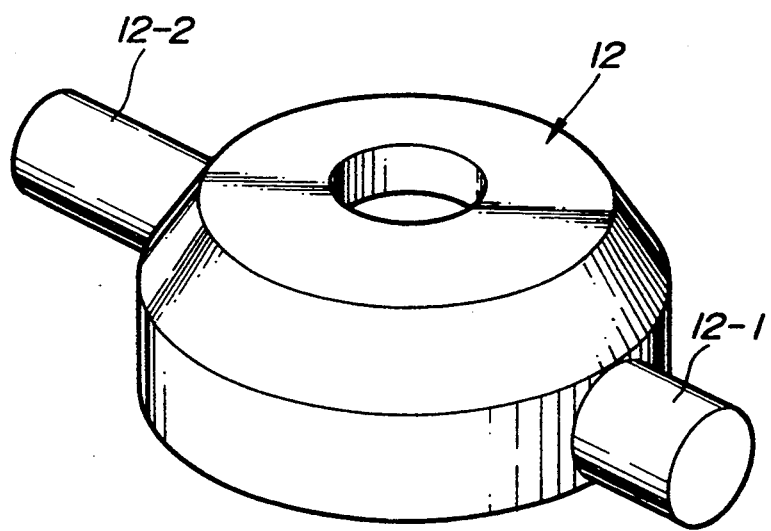
FIG. 9 is a perspective view of a swash plate for controlling the displacement of the hydraulic pump.

As shown in FIG. 4, the hydraulic pump chamber 4 houses a swash plate 12 therein with the input shaft 8 extending through the center of the swash plate 12. As also shown in FIG. 9, the swash plate 12 has a support shaft 12-1 on an end thereof which is angularly movably supported in a recess 2-1 defined in an outwardly projecting portion of one side of the case 2. The swash plate 12 also has an actuating shaft 12-2 on the opposite end thereof. The actuating shaft 12-2 is concentric with the support shaft 12-1. The actuating shaft 12-2, which is of an elongate shape, is angularly movably supported in and extends through the cover 11.

More specifically, the cover 11 has a bearing 11-1 (see also FIG. 10) by which the actuating shaft 12-2 is angularly movably supported. A control lever 13 is fastened to an outer end of the actuating shaft 12-2 by a bolt 14, and is normally held in a biased position with respect to the case 2 by a spring 15 as shown in FIG. 2. When the control lever 13 is pulled to turn about the axis of the bolt 14 by a control lever 16, the swash plate 12 is angularly moved about the shafts 12-1, 12-2 for thereby controlling the displacement of the hydraulic pump P.

The hydraulic pump P also has a thrust bearing 17 disposed centrally in the swash plate 12, and a plurality of pump plungers 18 arranged in a circular array around and spaced radially outwardly from the input shaft 8 (see FIG. 3). The pump plungers 18 have respective heads held in sliding contact with the thrust bearing 17 as shown in FIG. 4. The pump plungers 18 are axially slidably fitted in respective cylinder bores 19-1 defined in a cylinder 19 which is splined to the input shaft 8 and has an end held against the cover 6.

Figure 8:
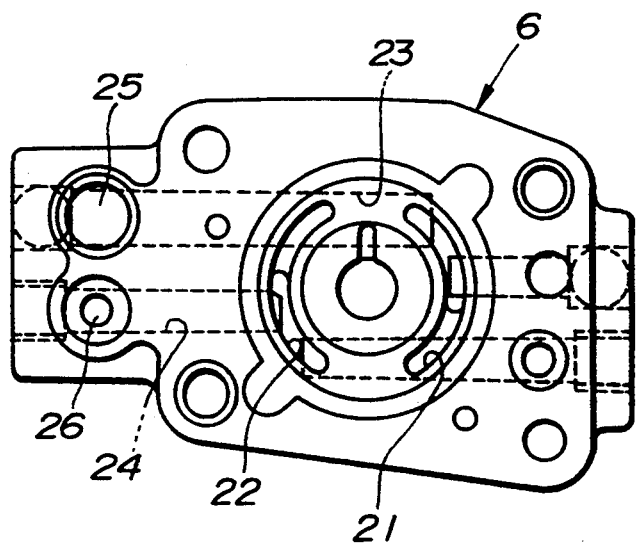
FIG. 8 is a cross-sectional view taken along line 8—8 of FIG. 4, showing a cover for a chamber of the hydraulic pump.

The cover 6, or the bottom panel of the hydraulic pump chamber 4, has oil grooves and oil passages as shown in FIGS. 3, 4, 5, 8, and 10. More specifically, as shown in FIGS. 3, 8, and 10, the cover 6 has an arcuate inlet groove 21 and an arcuate outlet groove 22 defined in its surface facing the hydraulic pump chamber 4 and extending around the input shaft 8. The inlet and outlet grooves 21, 22 are symmetrically shaped and spaced from each other. As shown in FIGS. 3 and 8, the cover 6 also has a straight inlet passage 23 and a straight outlet passage 24 defined therein. While the input shaft 8 and hence the cylinder 19 are rotated by the engine power transmitted to the pulley 10, working oil is introduced through a joint passage 25 in the cover 6, the inlet passage 23, a communication passage 23-1, and the inlet groove 21 into the cylinder bores 19-1 which positionally correspond to the inlet groove 21, via holes 19-2 in the cylinder 19 which communicate with the ends of the corresponding cylinder bores 19-1. When those cylinder bores 19-1 which have been supplied with the working oil reach the outlet groove 22 upon rotation of the cylinder 19, the working oil is discharged from the cylinder bores 19-1 and flow through the outlet groove 22, a communication passage 24-1 (see FIG. 5) in the cover 6, and the outlet passage 24 into a pressure oil passage 26 which is defined across the junction between the covers 6, 11. In this manner, the working oil supplied from the joint passage 25 is discharged from the pressure oil passage 26 by the hydraulic pump P.

Figure 6:
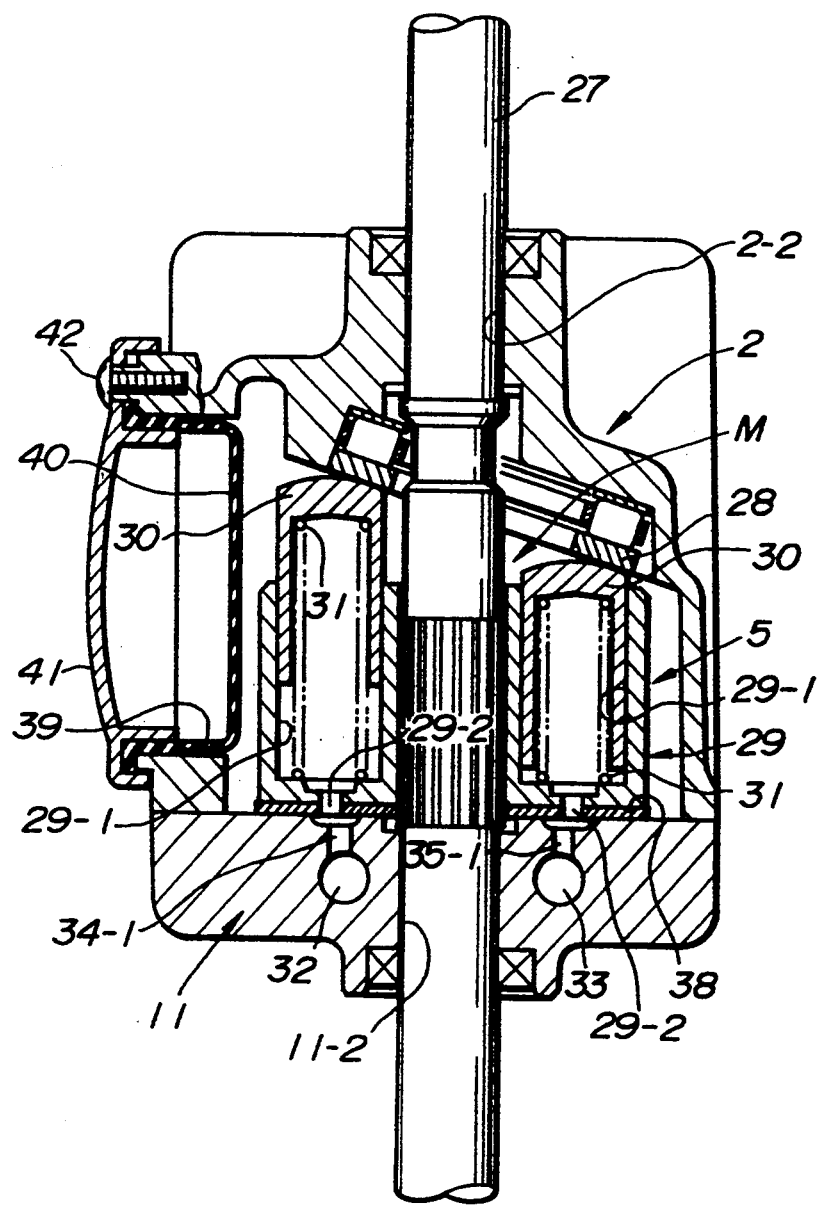
FIG. 6 is a cross-sectional view taken along line 6—6 of FIG. 1, showing a hydraulic motor.

As shown in FIGS. 3 and 6, the hydraulic motor M has an output shaft 27 extending through the hydraulic motor chamber 5 and rotatably supported by bearings 2-2, 11-2 in the case 2 and the cover 11. The output shaft 27 extends perpendicularly to and is spaced from the input shaft 8 in the hydraulic pump chamber 4. The hydraulic motor M includes a swash plate 28 fixedly mounted in an upper panel of the hydraulic motor chamber 5, and a cylinder 29 splined to an intermediate portion of the output shaft 27 within the hydraulic motor chamber 5. The cylinder 29 has a plurality of cylinder bores 29-1 defined therein in a circular array around and spaced radially outwardly from the output shaft 27. A plurality of plungers 30 which are axially biased respectively by springs 31 are axially slidably fitted in the respective cylinder bores 29-1. The plungers 30 have respective heads slidably held against the swash plate 28. As shown in FIG. 3, the cylinder 19 of the hydraulic pump P and the cylinder 29 of the hydraulic motor M are disposed such that their outer surfaces are in a close juxtaposed relationship within the case 2, with their axes perpendicular to each other.

Figure 7:
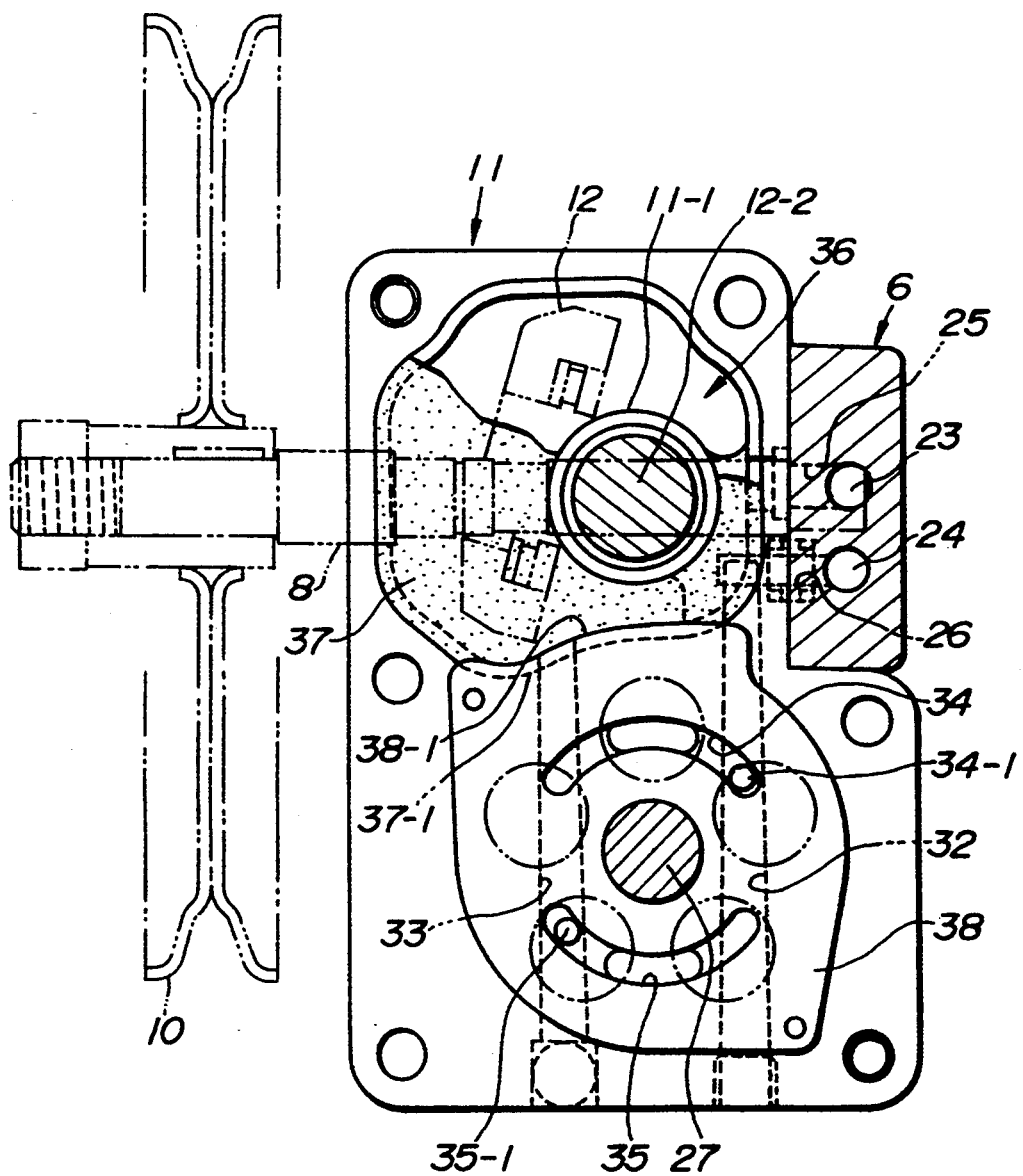
FIG. 7 is a cross-sectional view taken along line 7—7 of FIG. 4.

The cylinder 29 has a plurality of communication passages 29-2 defined in the bottoms of the respective cylinder bores 29-1. The cover 11, which also serves as the bottom of the hydraulic motor chamber 5, has a pressure oil passage 32 defined therein in communication with the pressure oil passage 26, and an outlet passage 33 defined therein in parallel spaced relationship to the pressure oil passage 32. As shown in FIG. 7, the cover 11 also has an arcuate inlet groove 34 and an outlet groove 35 defined in its surface facing the hydraulic motor chamber 5 and extending around the output shaft 27. The inlet and outlet grooves 34, 35 are symmetrically shaped and spaced from each other.

The inlet and outlet grooves 34, 35 have opposite ends held in communication with the passages 32, 33 through respective communication passages 34-1, 35-1. Working oil supplied from the hydraulic pump P through the pressure oil passage 32 which communicates with the pressure oil passage 26 is drawn through the communication passage 34-1 and the inlet groove 34 into those cylinder bores 29-1 which communicate with the inlet groove 34, pushing the corresponding plungers 30 against the swash plate 28. The cylinder 29 and hence the output shaft 27 are now rotated under reactive forces from the swash plate 28. Working oil which is forced from the cylinder bores 29-1 by the plungers 30 that are pushed by the swash plate 28 is discharged through the outlet groove 35, the communication passage 35-1, and the outlet passage 33. The outlet passage 33 is connected to a filter chamber 36 (see FIG. 7) defined in the cover 11 near the hydraulic pump chamber 4.

In FIG. 7, the communication passage 35-1 is positioned at the lefthand end of the outlet groove 35, and the communication passage 34-1 is positioned at the righthand end of the inlet groove 34. However, the communication passage 35-1 may be positioned at the righthand end of the outlet groove 35, and the communication passage 34-1 may be positioned at the lefthand end of the inlet groove 34. With such a modification, the groove 35 serves as an inlet groove and the groove 34 as an outlet groove, for thereby rotating the outlet shaft 27 in the opposite direction when the hydraulic motor M is in operation. Therefore, insofar as the working oil from the hydraulic pump P is supplied to the passage 32 and the swash plate 28 is inclined at a constant angle, the direction in which the output shaft 27 rotates can be selected as desired by selecting the position of the communication passages 34-1, 35-1. The continuously variable transmission 1 requires no special mechanism for reversing the rotation of the output shaft 27.

The output shaft 27 has opposite extensions 27-1 projecting from the case 2 and the cover 11, as shown in FIG. 3. The outer ends of the extensions 27-1 may thus be used to provide output rotation of the continuously variable transmission 1.

As shown in FIGS. 4, 7, and 10, a sheet-like filter 37 is interposed between an end surface of the hydraulic pump chamber 4 and the cover 11. The filter 37 defines the filter chamber 36 in the portion of the cover 11 which also defines the hydraulic pump chamber 4. Since the hydraulic pump chamber 4 and the hydraulic motor chamber 5 communicate with each other, the filter 37 has an edge portion that is not directly supported by the case 2 where the hydraulic pump chamber 4 and the hydraulic motor chamber 5 communicate with each other. As shown in FIG. 3, a cylinder plate 38 is held against the cylinder 29 and attached to the cover 11 at the bottom of the hydraulic motor chamber 5. As shown in FIGS. 7 and 10, the cylinder plate 38 has arcuate slots aligned respectively with the arcuate inlet and outlet grooves 34, 35, respectively. As shown in FIG. 7, the cylinder plate 38 has an edge portion 38-1 overlapping an edge portion 37-1 of the filter 37 which extends in the region where the hydraulic pump chamber 4 and the hydraulic motor chamber 5 communicate with each other. Accordingly, the filter 37 is firmly clamped between the cover 11 and the case 2 except in the region where the hydraulic pump chamber 4 and the hydraulic motor chamber 5 communicate with each other, and also between the cover 11 and the edge portion 38-1 of the cylinder plate 38 in the region where the hydraulic pump chamber 4 and the hydraulic motor chamber 5 communicate with each other.

The working oil discharged from the hydraulic motor M flows into the filter chamber 36, and is mixed with the working oil which is supplied from the hydraulic pump chamber 4 and filtered by the filter 37. The mixed working oil is then supplied to the hydraulic pump P through the joint passage 25 for recirculation through the hydraulic pump P and the hydraulic motor M.

As shown in FIG. 6, the case 2 has a hole 39 defined in a side panel thereof in communication with the hydraulic motor chamber 5, and an elastic membrane 40 is disposed in the hole 39 in covering relationship to the hole 39. The elastic membrane 40 is held against the case 2 by a cap 41 and fastened to the case 2 by a bolt 42. The elastic membrane 40 is elastically deformable to absorb expansion of working oil in the hydraulic pump and motor chambers 4, 5. The hydraulic pump and motor chambers 4, 5 are isolated from the exterior of the case 2 by the elastic membrane 40. Since the hydraulic pump and motor chambers 4, 5 are fully closed by the case 2, the covers 6, 11, and the elastic membrane 40, the continuously variable transmission 1 may be directed in any desired orientation and hence its layout can be freely selected with respect to the powered lawn mower 101 shown in FIG. 11. Furthermore, the working oil in the fully closed hydraulic pump and motor chambers 4, 5 is not exposed directly to ambient air. This prevents the oil from deteriorating, such that the oil has a long useful life. Since the elastic membrane 40 and the cap 41 are incorporated in the case 2, the number of parts used is minimized, resulting in a reduction in the cost of the continuously variable transmission 1.

As shown in FIG. 3, the cylinders 19, 29 of the hydraulic pump P and motor M are positioned in the single unitary case 2 such that their outer surfaces are close to each other in a juxtaposed relationship within the case 2. The input and output shafts 8, 27 extend coaxially through the cylinders 19, 39 and are perpendicularly to each other. The cylinders 19, 29 may therefore be located close to each other in a desired layout, and the input and output shafts 8, 27 may be to each other, separated only by a minimum distance required by the shaft layout. Consequently, the continuously variable transmission 1 may have a much smaller outer profile than the conventional continuously variable transmissions. Working machines such as powered lawn mowers or the like which incorporate the continuously variable transmission 1 may therefore be reduced in size and weight.

Since there is only one case 2 and since no special swash plate bearings are needed in the continuously variable transmission 1, the continuously variable transmission 1 has relatively few parts. The covers 6, 11 serving as base plates for distributing hydraulic pressure for the hydraulic pump P and the hydraulic motor M are separate from each other. Therefore, the various oil passages and grooves can easily be machined in the covers 6, 11, and hence the covers 6, 11 can be inexpensively manufactured. Since the continuously variable transmission 1 has relatively few parts and since the parts are relatively small in size and weight, the transmission 1 can be easily assembled. The continuously variable transmission 1 can thus be manufactured easily and inexpensively.

The output rotation of the continuously variable transmission 1 can easily be extracted as either one of the opposite ends of the output shaft 27 is available as an output end.

The direction of rotation of the hydraulic motor M can be easily selected by simply selecting the position of the communication passages 34-1, 35-1 with respect to the inlet and outlet passages 32, 33 defined in the cover 11 insofar as the working oil from the hydraulic pump P is supplied to the passage 32 and the swash plate 28 is inclined at a constant angle.

The edge portion 37-1 of the filter 37 is clamped between the cover 11 and the edge portion 38-1 of the cylinder plate 38 in the region where the hydraulic pump chamber 4 and the hydraulic motor chamber 5 communicate with each other. As a consequence, the filter 37 is firmly secured in place. Inasmuch as the filter 37 is clamped by the cylinder plate 38, rather than by any dedicated filter support component, the number of parts used is reduced, and the filter 37 can be supported with ease. In addition, the case 2 is simpler in structure and smaller in size than it would be if the filter 37 were supported solely by the case 2.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A continuously variable transmission for transmitting the power of an engine to wheels at a variable speed reduction ratio, comprising:
    a case;
    an axial-plunger-type hydraulic pump disposed in said case for producing hydraulic pressure, said hydraulic pump having an input shaft and a pump cylinder with a plurality of pump plungers axially movably disposed therein, said pump plungers having an axial stroke range, said pump cylinder having an axis of rotation and an outer cylindrical surface; and
    an axial-plunger-type hydraulic motor disposed in said case for producing rotary motion in response to the hydraulic pressure produced by said hydraulic pump, said hydraulic motor having an output shaft and a motor cylinder with a plurality of motor plungers axially movably disposed therein, said motor plungers having an axial stroke range, said motor cylinder having an axis of rotation and an outer cylindrical surface;
    said axes of said pump and motor cylinders being perpendicular to each other, said transmission being arranged such that the distance between said pump cylinder and said motor cylinder is less than the distance between said pump cylinder and the axis of rotation of said motor cylinder, and such that the distance between said pump cylinder and said motor cylinder is less than the distance between said motor cylinder and the axis of rotation of said pump cylinder, and said transmission being arranged such that said outer cylindrical surfaces of said pump and motor cylinders are directly next to each other, with no partition between said pump and motor cylinders, to minimize the spacing between said axes of rotation, and to reduce the size and weight of said transmission, said input shaft being disposed between first and second motor planes and said output shaft being disposed between first and second pump planes, where the first pump plane is perpendicular to the input shaft and passes through a first end of one of the pump plungers, when the first end is in an extreme position, the second pump plane is perpendicular to the input shaft and passes through a second end of one of the pump plungers, when said second end is in an extreme position, the first motor plane is perpendicular to the output shaft and passes through a first end of one of the motor plungers, when the first motor plunger end is in an extreme position, and the second motor plane is perpendicular to the output shaft and passes through a second end of one of the motor plungers, when the second motor plunger end is in an extreme position.

2. A continuously variable transmission according to claim 1, wherein said hydraulic pump and said hydraulic motor are directly supported at the inner side of said case, closely side by side with no space therebetween.

3. A continuously variable transmission according to claim 2, wherein said transmission has covers mounted on said case and said pump cylinder and said motor cylinder are directly supported at said covers.

4. A continuously variable transmission according to claim 2, wherein said hydraulic pump and motor each includes swash plates, said swash plates of said hydraulic pump and of said hydraulic motor, respectively, are directly supported by said case.

5. A continuously variable transmission for transmitting the power of an engine to wheels at a variable speed reduction ratio, comprising:
    a case;
    an axial-plunger-type hydraulic pump disposed in said case for producing hydraulic pressure, said hydraulic pump having a pump cylinder with a plurality of pump plungers axially movably disposed therein, said pump cylinder having an axis of rotation and an outer cylindrical surface; and
    an axial-plunger-type hydraulic motor disposed in said case for producing rotary motion in response to the hydraulic pressure produced by said hydraulic pump, said hydraulic motor having a motor cylinder with a plurality of motor plungers axially movably disposed therein, said motor cylinder having an axis of rotation and an outer cylindrical surface;
    said axes of said pump and motor cylinders being perpendicular to each other, said transmission being arranged such that the distance between said pump cylinder and said motor cylinder is less than the distance between said pump cylinder and the axis of rotation of said motor cylinder, and such that that the distance between said pump cylinder and said motor cylinder is less than the distance between said motor cylinder and the axis of rotation of said pump cylinder, and said transmission being arranged such that said outer cylindrical surfaces of said pump and motor cylinders are directly next to each other, with no partition between said pump and motor cylinders, to minimize the spacing between said axes of rotation, and to reduce the size and weight of said transmission;

said hydraulic pump having an input shaft and said hydraulic motor having an output shaft, said input and output shafts extending coaxially through said pump and motor cylinders, respectively, in spaced perpendicular relationship to each other, said hydraulic pump and said hydraulic motor having respective base plates for distributing hydraulic pressure to said pump and motor cylinder, said base plates serving as covers for said case, said base plates being mounted on said case.

6. A continuously variable transmission according to claim 5, wherein said hydraulic pump has a hydraulic pump chamber and a swash plate, said pump chamber being located within said case, said swash plate being in sliding contact with said pump plungers and being angularly movably disposed in said hydraulic pump chamber for adjusting the displacement of said hydraulic pump, said swash plate having opposite ends and shafts, said shafts being located at said opposite ends of said swash plate, one of said shafts being angularly movably supported by said case, and the other of said shafts being angularly movably supported by the base plate of said hydraulic motor, whereby said swash plate can be angularly moved about said shafts.

7. A continuously variable transmission according to claim 5, wherein said hydraulic motor has a hydraulic motor chamber located within said case, said output shaft extending through said hydraulic motor chamber and having opposite ends projecting from said case and the base plate of said hydraulic motor, whereby the rotary motion produced by said hydraulic motor can be applied at either one of said opposite ends of said output shaft.

8. A continuously variable transmission according to claim 5, wherein said base plate of said hydraulic motor has a pair of symmetrically shaped arcuate grooves and a pair of oil passages, said oil passages being in communication with said arcuate grooves.

9. A continuously variable transmission according to claim 5, wherein said hydraulic pump has a pump chamber defined in said case, and said hydraulic motor has a motor chamber defined in said case, said motor chamber being in communication with said pump chamber, said case having a hole defined therein, said transmission further including an elastic membrane for elastically absorbing expansion of working oil in said pump and motor chambers, said elastic membrane being disposed in said hole and fixed to said case and covering said hole, said pump and motor chambers being isolated from the exterior of said case by said elastic membrane.

10. A continuously variable transmission for transmitting the power of an engine to wheels at a variable speed reduction ratio, comprising:

a case;

an axial-plunger-type hydraulic pump disposed in said case for producing hydraulic pressure, said hydraulic pump having an input shaft and a pump cylinder with a plurality of pump plungers axially movably disposed therein, said pump plungers having an axial stroke range, said pump cylinder having an axis of rotation; and an axial-plunger-type hydraulic motor disposed in said case for producing rotary motion in response to the hydraulic pressure produced by said hydraulic pump, said hydraulic motor having an output shaft and a motor cylinder with a plurality of motor plungers axially movably disposed therein, said motor plungers having an axial stroke range, said motor cylinder having an axis of rotation;

said pump and motor cylinders being close to each other, said axes of said pump and motor cylinders being perpendicular to each other, said input shaft being disposed between first and second motor planes and said output shaft being disposed between first and second pump planes, where the first pump plane is perpendicular to the input shaft and passes through a first end of one of the pump plungers, when the first end is in an extreme position, the second pump plane is perpendicular to the input shaft and passes through a second end of one of the pump plungers, when said second end is in an extreme position, the first motor plane is perpendicular to the output shaft and passes through a first end of one of the motor plungers, when the first motor plunger end is in an extreme position, and the second motor plane is perpendicular to the output shaft and passes through a second end of one of the motor plungers, when the second motor plunger end is in an extreme position; and wherein said input and output shafts extend coaxially through said pump and motor cylinders, respectively, in spaced perpendicular relationship to each other, said hydraulic pump and said hydraulic motor having respective base plates for distributing hydraulic pressure to said pump and motor cylinders, said base plates serving as covers for said case, said base plates being mounted on said case.

11. A continuously variable transmission according to claim 10, wherein said hydraulic pump has a hydraulic pump chamber and a swash plate, said pump chamber being located within said case, said swash plate being in sliding contact with said pump plungers and being angularly movably disposed in said hydraulic pump chamber for adjusting the displacement of said hydraulic pump, said swash plate having opposite ends and shafts, said shafts being located at said opposite ends of said swash plate, one of said shafts being angularly movably supported by said case, and the other of said shafts being angularly movably supported by the base plate of said hydraulic motor, whereby said swash plate can be angularly moved about shafts.

12. A continuously variable transmission according to claim 10, wherein said hydraulic motor has a hydraulic chamber located within said case, said output shaft extending through said hydraulic motor chamber and having opposite ends projecting from said case and the base plate of said hydraulic motor, whereby the rotary motion produced by said hydraulic motor can be applied at either one of said opposite ends of said output shaft.

13. A continuously variable transmission according to claim 10, wherein said base plate of said hydraulic motor has a pair of symmetrically shaped arcuate grooves and a pair of oil passages, said oil passages being in communication with said arcuate grooves.

14. A continuously variable transmission for transmitting the power of an engine to wheels at a variable speed reduction ratio, comprising:

a case;

an axial-plunger-type hydraulic pump disposed in said case for producing hydraulic pressure, said hydraulic pump having a pump cylinder with a plurality of pump plungers axially movably disposed therein, said pump cylinder having an axis of rotation; and an axial-plunger-type hydraulic motor disposed in said case for producing rotary motion in response to the hydraulic pressure produced by said hydraulic pump, said hydraulic motor having a motor cylinder with a plurality of motor plungers axially movably disposed therein, said motor cylinder having an axis of rotation;

said pump and motor cylinders being close to each other, with said axes of rotation being perpendicular to each other; and wherein said hydraulic pump has an input shaft and said hydraulic motor has an output shaft, said input and output shafts extending coaxially through said pump and motor cylinders, respectively, in spaced perpendicular relationship to each other, said hydraulic pump and said hydraulic motor having respective base plates for distributing hydraulic pressure to said pump and motor cylinders, said base plates serving as covers for said case, said base plates being mounted on said case; and wherein said hydraulic motor has a cylinder plate held against said motor cylinder, said hydraulic pump having a filter for filtering oil to be supplied to said pump cylinder, said filter being fixed in place by said case, said base plate of the hydraulic motor, and a portion of said cylinder plate.

15. A continuously variable transmission for transmitting the power of an engine to wheels at a variable speed reduction ratio, comprising:

a case;

an axial-plunger-type hydraulic pump disposed in said case for producing hydraulic pressure, said hydraulic pump having an input shaft and a pump cylinder with a plurality of pump plungers axially movably disposed therein, said pump plungers having an axial stroke range, said pump cylinder having an axis of rotation and an outer cylindrical surface; and an axial-plunger-type hydraulic motor disposed in said case for producing rotary motion in response to the hydraulic pressure produced by said hydraulic pump, said hydraulic motor having a motor cylinder with a plurality of motor plungers axially movably disposed therein, said motor plungers having an axial stroke range, said motor cylinder having an axis of rotation and an outer cylindrical surface;

said axes of said pump and motor cylinders being perpendicular to each other, said transmission being arranged such that said outer cylindrical surfaces of said pump and motor cylinders are directly next to each other, with no partition between said pump and motor cylinders, to minimize the spacing between said axes of rotation, and to reduce the size and weight of said transmission, said input shaft being disposed between first and second motor planes and said output shaft being disposed between first and second pump planes, where the first pump plane is perpendicular to the input shaft and passes through a first end of one of the pump plungers, when the first end is in an extreme position, the second pump plane is perpendicular to the input shaft and passes through a second end of one of the pump plungers, when said second end is in an extreme position, the first motor plane is perpendicular to the output shaft and passes through a first end of one of the motor plungers, when the first motor plunger end is in an extreme position, and the second motor plane is perpendicular to the output shaft and passes through a second end of one of the motor plungers, when the second motor plunger end is in an extreme position.

16. A continuously variable transmission for transmitting the power of an engine to wheels at a variable speed reduction ratio, comprising:

a case;

an axial-plunger-type hydraulic pump disposed in said case for producing hydraulic pressure, said hydraulic pump having an input shaft and a pump cylinder with a plurality of pump plungers axially movably disposed therein, said pump plungers having an axial stroke range, said pump cylinder having an axis of rotation; and an axial-plunger-type hydraulic motor disposed in said case for producing rotary motion in response to the hydraulic pressure produced by said hydraulic pump, said hydraulic motor having an output shaft and a motor cylinder with a plurality of motor plungers axially movably disposed therein, said motor plungers having an axial stroke range, said motor cylinder having an axis of rotation;

said pump and motor cylinders being close to each other, said axes of said pump and motor cylinders being perpendicular to each other, said input shaft being disposed between first and second motor planes and said output shaft being disposed between first and second pump planes, where the first pump plane is perpendicular to the input shaft and passes through a first end of one of the pump plungers, when the first end is in an extreme position, the second pump plane is perpendicular to the input shaft and passes through a second end of one of the pump plungers, when said second end is in an extreme position, the first motor plane is perpendicular to the output shaft and passes through a first end of one of the motor plungers, when the first motor plunger end is in an extreme position, and the second motor plane is perpendicular to the output shaft and passes through a second end of one of the motor plungers, when the second motor plunger end is in an extreme position; and wherein said case includes a one-piece cover-plate covering said pump and motor cylinders, said cover-plate including oil passages between the pump and the motor.

* * * * *